US008753178B2

(12) United States Patent
Jensen et al.

(10) Patent No.: US 8,753,178 B2
(45) Date of Patent: Jun. 17, 2014

(54) SCORING MACHINE

(71) Applicant: Teknologisk Institut, Taastrup (DK)

(72) Inventors: Carsten Jensen, Roskilde (DE); Jens Scheller Andersen, Birkerød (DK); Jimmy Guldhammer, Kalundborg (DK); Kuhr Petersen, København (DK); Benny Lauritzen, Vojens (DK); Kurt Hansen, Sønderborg (DK)

(73) Assignee: Teknologisk Institut, Taastrup (DK)

( * ) Notice: Subject to any disclaimer, the term of this patent is extended or adjusted under 35 U.S.C. 154(b) by 0 days.

(21) Appl. No.: 13/875,740

(22) Filed: May 2, 2013

(65) Prior Publication Data

US 2013/0303063 A1 Nov. 14, 2013

(30) Foreign Application Priority Data

May 14, 2012 (DK) ................................ 2012 00338

(51) Int. Cl.
*A22C 18/00* (2006.01)
(52) U.S. Cl.
USPC .......................................... 452/148
(58) Field of Classification Search
USPC ................... 452/30, 141, 148, 198, 142, 143; 99/430, 431; 426/518, 537; 83/932, 83/861, 863–865, 875, 879, 886, 155, 880, 83/331, 332, 339, 422, 591
See application file for complete search history.

(56) References Cited

U.S. PATENT DOCUMENTS 2,216,216 A    10/1940  Spang
2,675,580 A *   4/1954  Pesce ............................. 452/30
2,981,971 A *   5/1961  Zubrychi ........................ 452/30
3,099,307 A     7/1963  Morgan
3,902,388 A     9/1975  New
4,442,761 A *   4/1984  Van Achterberg et al. ..... 99/404
4,524,894 A *   6/1985  Leblond ............................ 225/2
4,815,165 A *   3/1989  Gibson ........................ 452/141

(Continued)

FOREIGN PATENT DOCUMENTS

DE         19950947 A1    5/2000

OTHER PUBLICATIONS

Office Action for Denmark Application No. 56976116, dated Dec. 18, 2012.

(Continued)

*Primary Examiner* — Richard Price, Jr.
(74) *Attorney, Agent, or Firm* — Marshall, Gerstein & Borun LLP

(57) ABSTRACT

A scoring machine (1) for scoring a surface of an item which is substantially plane in its main dimension and is curved transversely to its main dimension, the item being moved along a transport path (2) in a direction of movement (3), such as a surface of an item being conveyed forwards by means of a number of conveyors (4,5,6), the scoring machine 1 comprising a structure (11) with a curved path (7) of substantially the same curvature as the conveyed item transversely to its main dimension, and a number of scoring devices (14) being mounted on the structure (11) in such a manner that the scoring devices (14) are movable along the curved path (7) extending transversely to both the transport path (2) and the direction of movement (3) of the item moved, which makes it possible to score the surface of items in a uniform manner regardless of the point of time of the working day on surfaces of up to 700 items an hour and in a hygienic manner.

21 Claims, 4 Drawing Sheets

(56) References Cited

U.S. PATENT DOCUMENTS

Figure 1:
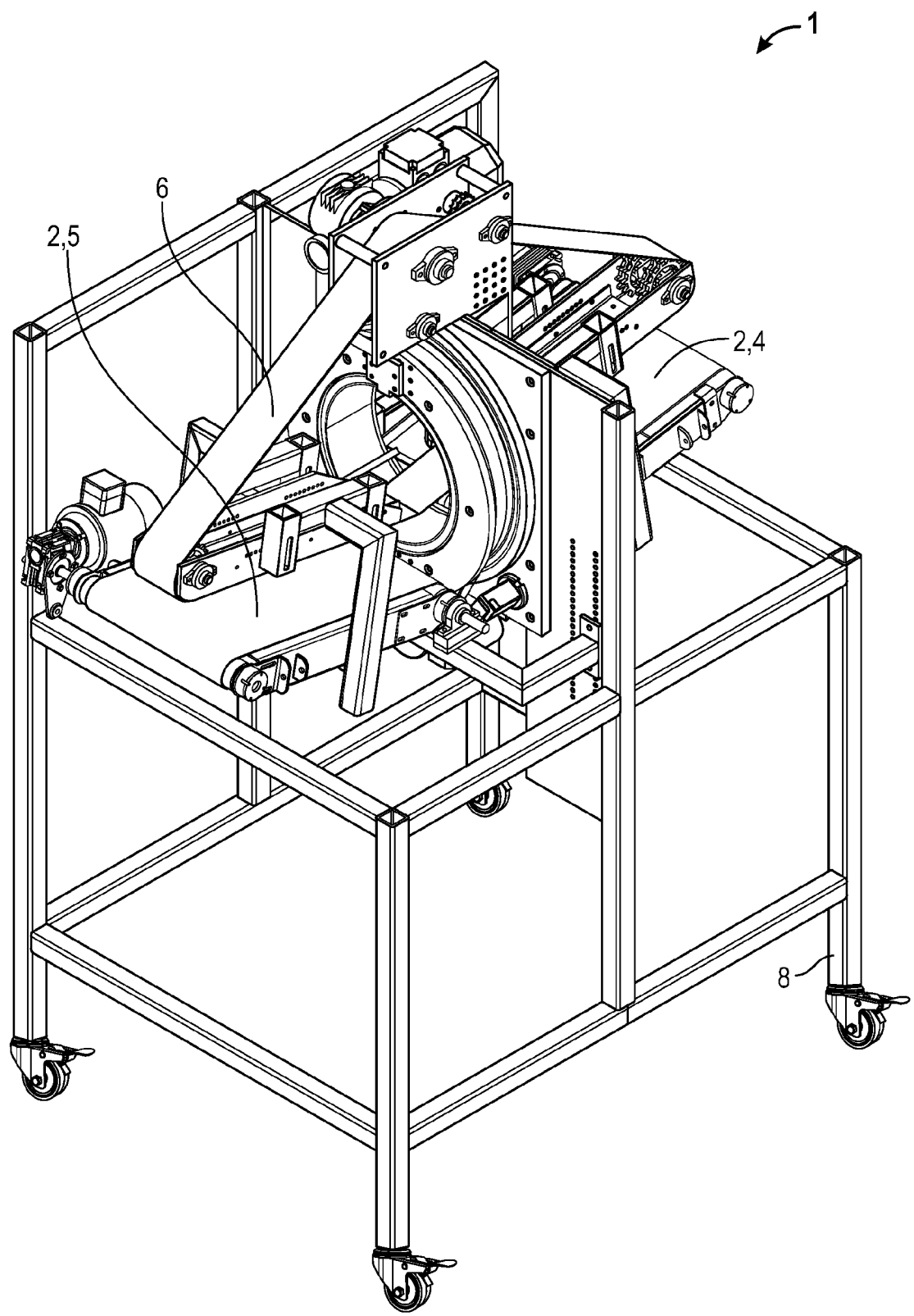

| | | | |
|---|---|---|---|
| 4,816,277 A * | 3/1989 | Frankstein et al. | 426/482 |
| 4,873,746 A * | 10/1989 | Scheier et al. | 452/136 |
| 5,331,874 A * | 7/1994 | Foster et al. | 83/423 |
| 5,746,106 A * | 5/1998 | Hodges | 83/884 |
| 6,231,911 B1 * | 5/2001 | Steinback et al. | 426/518 |
| 6,351,927 B1 * | 3/2002 | Righele et al. | 53/517 |
| 7,141,259 B2 * | 11/2006 | Capodieci | 426/238 |
| 8,162,729 B2 * | 4/2012 | Bilowski et al. | 452/49 |

OTHER PUBLICATIONS

Notice of Allowance for Denmark Application No. 56976116, dated Jan. 24, 2013.

* cited by examiner

SCORING MACHINE

The present invention relates to a scoring machine for scoring a surface of an item which is substantially plane in its main dimension and is curved transversely to its main dimension, the item being moved along a transport path in a direction of movement, such as a surface of an item being conveyed forwards by means of a number of conveyors.

The present invention also relates to the use of the said scoring machine.

PRIOR ART

Before the development of the present invention, it was known to score a surface of an item by means of a manually operated scoring device. Such scoring device might be simply a knife or one or more knife blades joined in a handle. Such manually operated scoring device would thus make it possible to make several simultaneous and parallel scores in the item.

One of the disadvantages of this scoring work is that it is work causing repetitive strain injury (RSI), that is, work in which the same work operation is repeated at intervals of few seconds or minutes. However, such work may cause large both physical and mental working environment problems and should therefore be avoided.

Another one of the disadvantages of this work is that it is very slow and will cause the end products to be very non-uniform.

The industry has therefore also several times experimented with the use of machines for the scoring process to make it semi- or fully automatic. Before the development of the present invention, it was thus known to manually place the items to be scored into a holder, which was a substantially stationary installation, the items being held fast and immovable during the scoring process. Subsequently, the items could then be removed again manually and new items placed in the holder.

However, one of the disadvantages of this semi-automatic scoring process was also work causing repetitive strain injury in the form of placing items into holders and removing the items. Moreover, these devices also suffered from the disadvantage that, owing to the scoring, the end products may have had the same interval between the scores made, but the scores were made in a very non-uniform manner and did not have the same scoring depth in the surfaces of the items, and as an example, the devices scored through the membrane between skin and flesh, or the devices scored inadequately. This in turn resulted in the need to score the items manually afterwards, which was inexpedient from the point of view of time, manpower and thereby economy.

OBJECT OF THE INVENTION

The object of this invention is therefore to provide a scoring machine of the type mentioned in the introduction which scores the surface of items faster and better than prior-art technology. In any circumstances, it is an object of the invention to provide a scoring machine that scores the surface of items in a uniform manner regardless of the point of time of the working day, uniformity of scoring being of great significance to the perceived quality. In case of, for example, the scoring of a loin, the rind must be scored and cut through across the entire loin in an unbroken cut and so that the scoring does not penetrate membranes and enter the fillet.

It is a further object of the invention to make it possible to score surfaces of up to 700 items an hour, one item being, for example, a portion of a carcass, such as a loin piece which, with for example an average length of 620 mm and a scoring interval of 10 mm, requires scoring 60 times. Accordingly, the scoring must be carried out while the items are being moved along a transport path in a direction of transportation.

It is a further object of the invention that the scoring machine is to be hygienic to make it suitable for use on foods, and particularly for arrangement in a cutting line in a slaughterhouse. Additionally, the scoring device must be easy to operate and maintain so that it does not imply an inexpediently large need of staff hours.

DESCRIPTION OF THE INVENTION

According to a first aspect of the invention, the above object is achieved with a scoring machine of the type mentioned in the introduction, the scoring machine comprising a structure with a curved path adapted to have substantially the same curvature as the conveyed item transversely to its main dimension, and a number of scoring devices being mounted in the structure in such a manner that the scoring devices are movable along the curved path extending transversely to both the transport path and the direction of movement of the item moved.

This makes it possible to score the surface of items, for example a portion of a carcass, such as a loin piece, which in fact has a curvature transversely to its main dimension.

In a second aspect, the present invention also relates to a scoring machine, the structure comprising a tubular bearing having an internal tubular bearing part with a curved path and an external tubular bearing part, the scoring device being mounted on the external tubular bearing part in such a manner that the scoring device can rotate about the centre line of the tubular bearing parts and transversely to the direction of movement of the item moved by means of a drive mechanism.

This makes it possible to guide the scoring devices in the same direction transversely to the main dimension of the item to be scored as the scoring devices can thus rotate about the item and do not necessarily have to make a reciprocating movement.

In a third aspect, the present invention also relates to a scoring machine, the scoring device being mounted on the end of the external tubular bearing part which faces away from the direction of movement of the item moved.

This makes it possible to score the item when it is moved away from the tubular bearing and not when it is guided into the tubular bearing, thus avoiding a braking effect of the scores during the passage of the tubular bearing.

In a fourth aspect, the present invention also relates to a scoring machine, the scoring machine further comprising a frame with a plate, the plate having a hole, and the internal tubular bearing part being firmly mounted on the plate in such a manner that the hole and the internal tubular bearing part have substantially the same centre line and that the diameter of the hole is at least equal to or larger than the inside diameter of the internal tubular bearing part.

This makes it possible to make at least one embodiment of a so-called stand-alone apparatus that can be inserted into a slaughter line instead of, for example, a derinding machine if and when needed.

In a fifth aspect, the present invention also relates to a scoring machine, the scoring machine comprising a number of conveyors, a first conveyor leading to the side of the structure facing against the direction of movement of the item moved, and a second conveyor leading away from the structure in the direction of movement of the item moved.

This makes it possible to convey the item to be scored forward to the scoring machine and the scoring devices.

In a sixth aspect, the present invention also relates to a scoring machine, the scoring machine further comprising a third conveyor extending through the hole and having, along a length thereof, substantially the same distance from the sides to the first conveyor or the second conveyor.

This makes it possible to convey the item to be scored forwards the whole way through the tubular bearing, the item to be scored moving between two conveyors on the inlet side, between one conveyor and the internal tubular bearing part through the tubular bearing part and between two conveyors on the discharge side.

In a seventh aspect, the present invention also relates to a scoring machine, the internal tubular bearing part having a number of guiding devices.

This makes it possible to guide the item to be scored through the tubular bearing in such a manner that the item does not behave inexpediently in the form of making folds, running askew or making other undesired movements.

In an eighth, a ninth and a tenth aspect, the present invention also relates to a scoring machine, the internal tubular bearing part having a diameter of 230-310 mm, preferably 250-290 mm, and most preferably 270 mm, the external tubular bearing part having a diameter of 360-3440 mm, preferably 380-420 mm, and most preferably 400 mm, and the tubular bearing having a height of 60-140 mm, preferably 80-120 mm, and most preferably 100 mm, respectively.

This makes it possible to make at least one embodiment that fits the most common items to be scored.

In an eleventh and twelfth aspect, the present invention also relates to a scoring machine, the drive mechanism comprises a motor mounted on a bracket on the plate, the motor driving the external tubular bearing part by means of a belt, the belt comprising a flat belt, a toothed belt or a V-belt.

This makes it possible to carry out the scoring automatically at the same speed and scoring rate, whereby the scoring becomes much more uniform than at manual scoring.

In a thirteenth aspect, the present invention also relates to a scoring machine, the scoring machine further having detection means in the form of, for example, sensors or light barriers.

When the detection means are set at, for example, the scoring devices, this makes it possible to stop the machine as soon as a change in the condition of the scoring devices is detected, such as a pre-set wear threshold or damage suddenly arisen during production.

In a fourteenth aspect, the present invention also relates to a scoring machine, the scoring devices comprise ceramic scoring devices.

This makes it possible to uphold a longer life and minimise the tendency for the scoring devices to break.

In a fifteenth aspect, the present invention also relates to the use of a scoring machine for scoring portions of a carcass, the portions being, for example, loin pieces.

Accordingly, this makes it possible to score the surface of items in a uniform manner regardless of the point of time of the working day, of surfaces of up to 700 items an hour and in a hygienic manner.

DRAWING

Figure 2:
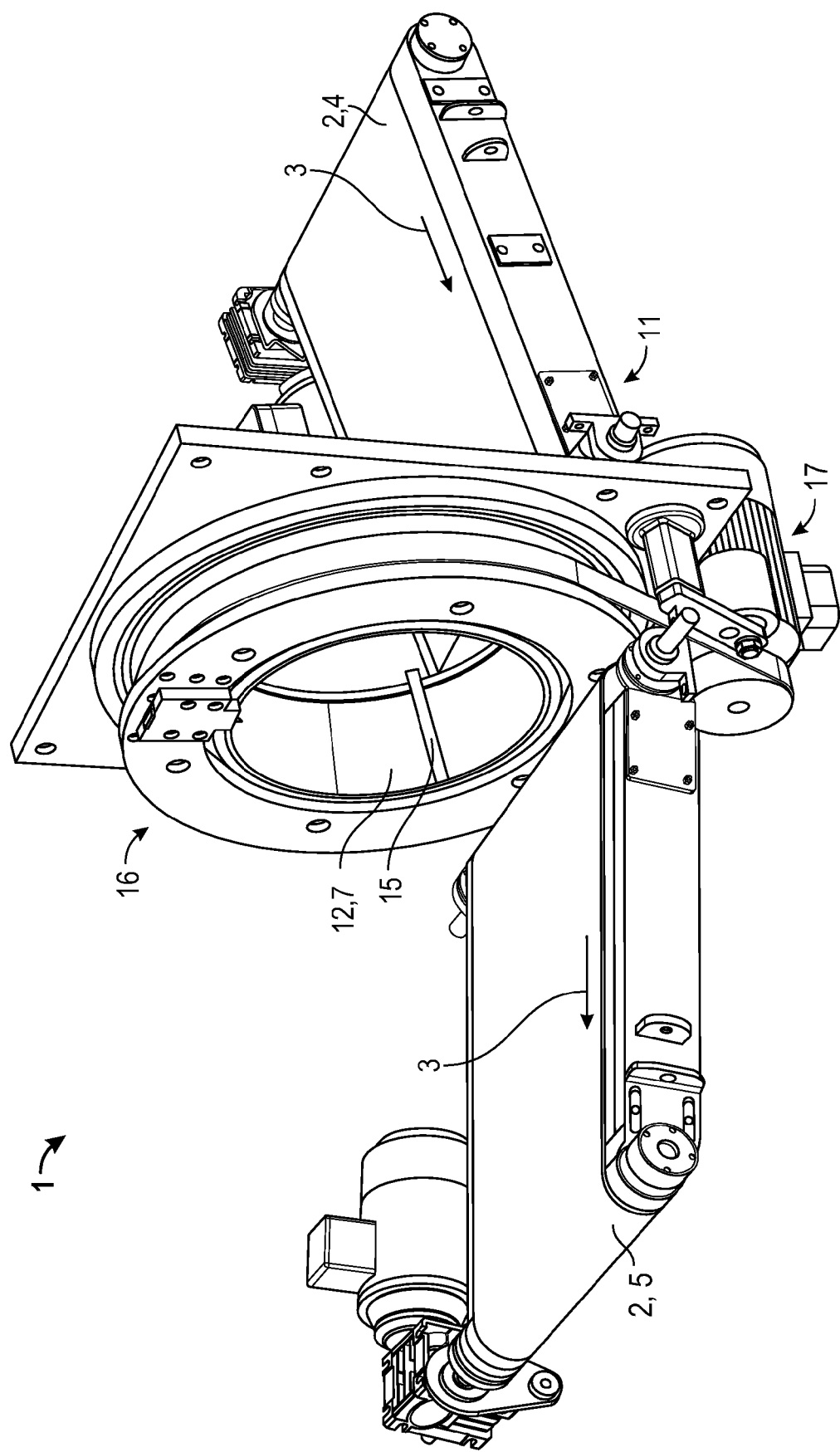
Figure 3:
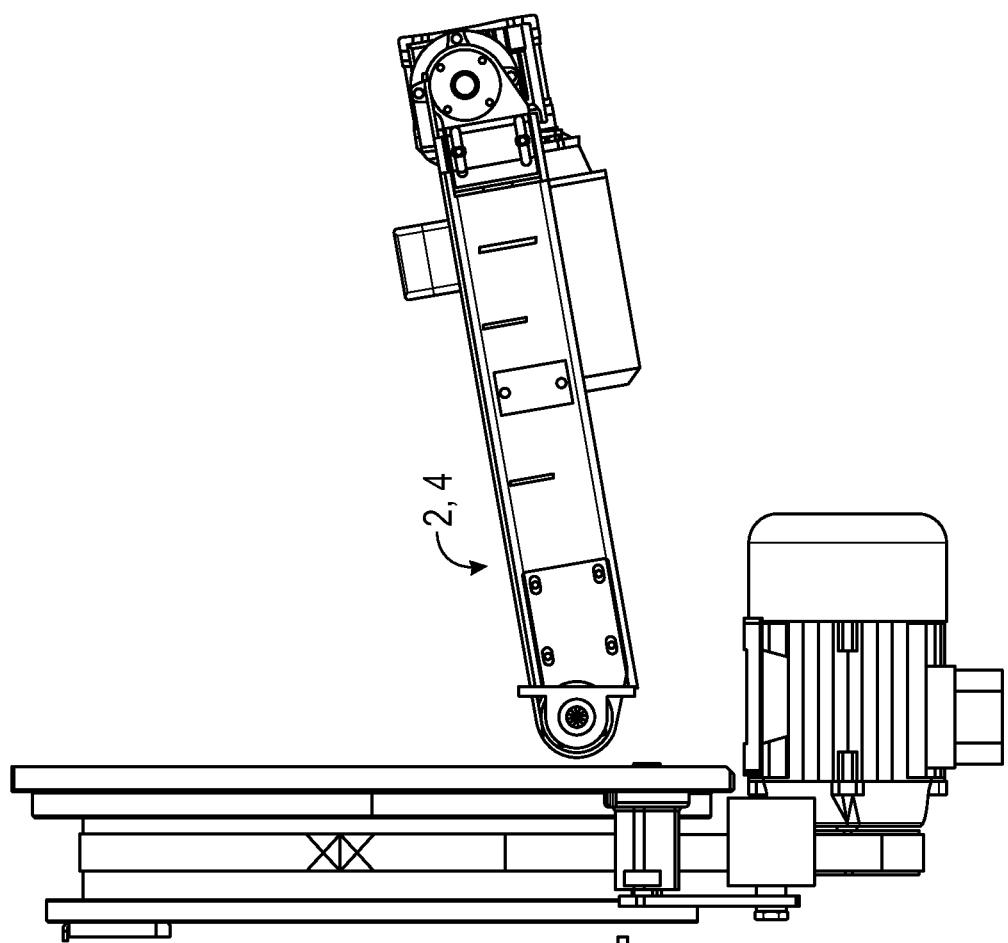
Figure 4:
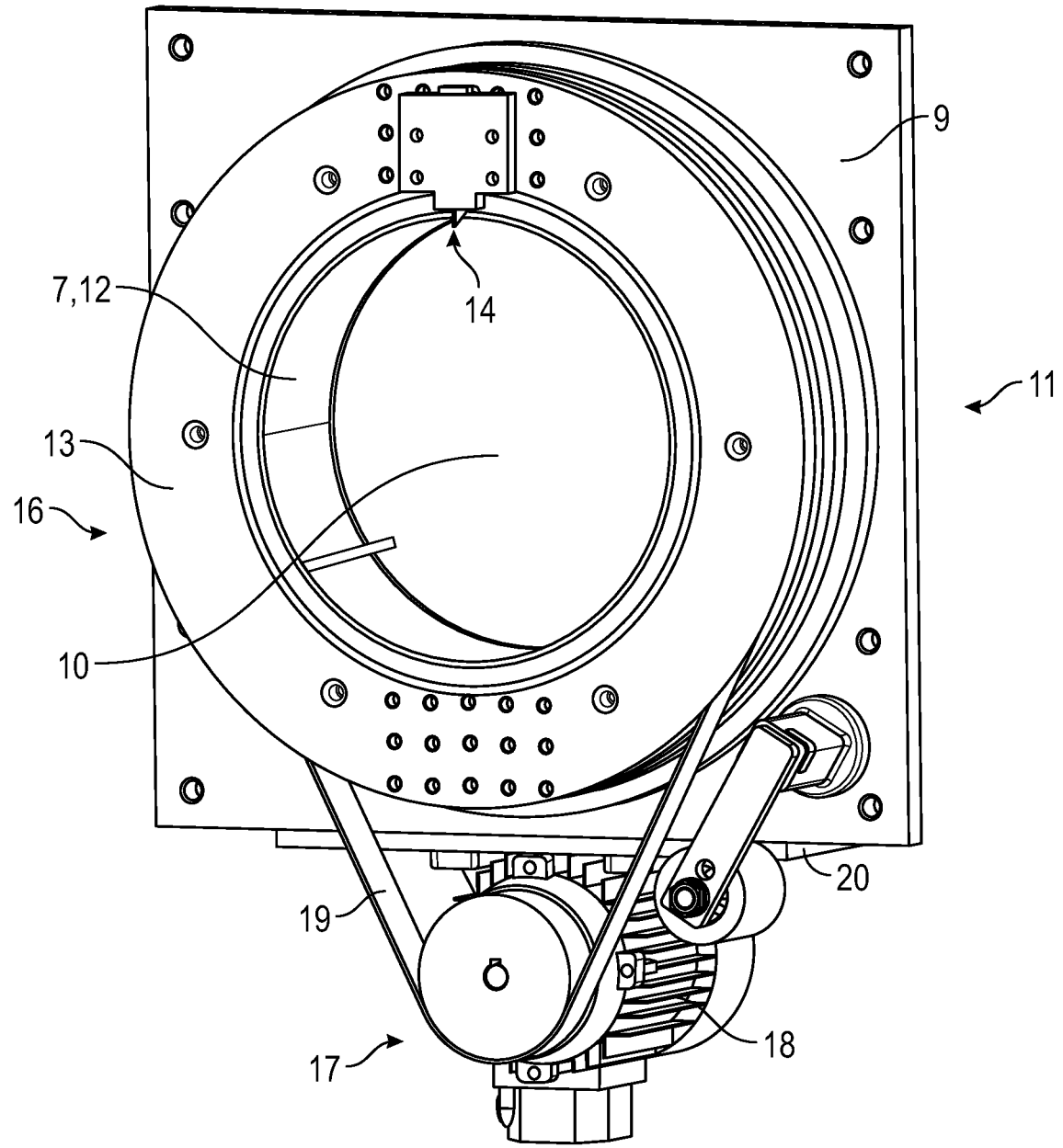

The invention will be described in further detail below by means of non-limiting embodiments with reference to the drawing, in which:

FIG. 1 shows a perspective view of the scoring machine;
FIG. 2 shows a perspective view of the structure and two conveyors;
FIG. 3 shows a side view of the structure and two conveyors; and
FIG. 4 shows a perspective view of the structure with tubular bearing and drive mechanism.

DETAILED DESCRIPTION OF THE INVENTION

A scoring machine according to the invention for scoring a surface of an item is shown in FIG. 1.

The embodiment of a scoring machine shown in FIG. 1 is an example of a set-up of the scoring machine 1 in which it can directly form part of a slaughter line as a stand-alone machine. Frequency converters, a control cabinet and the like are not shown in the Figure, but will form part of the scoring machine 1 in a preferred embodiment.

The scoring machine 1 has a frame 8 that can naturally be built in very many different shapes according to desire and needs and requirements made of ease of operation, maintenance and cleaning. Additionally, the frame 8 may have a number of wheels to make it easier to manoeuvre the scoring machine 1.

As appears from the embodiment shown in FIG. 1, a transport path 2 is constituted by a first conveyor 4, which is able, in a direction of movement 3 (see FIG. 2), to convey items to be scored forwards to the scoring devices 14 (see FIG. 4), whereupon a second conveyor 5 is able to move items away from the scoring devices 14, likewise in the same direction of movement 3.

FIG. 1 also shows a third conveyor 6 having the same direction of movement 3 as the other two conveyors 4, 5. The conveyor 6 extends through the hole 10 (see FIG. 4) so that at least along a length of the conveyor 6, the conveyor 6 has substantially the same distance from the sides thereof to the first conveyor 4 or the second conveyor 5, i.e. extends in parallel with the first conveyor 4 or the second conveyor. In all other respects, the same considerations as already mentioned for the conveyors 4, 5 apply as to the nature of the conveyor 6. Accordingly, the conveyor 6 does not necessarily have the same dimensions as the other conveyors 4, 5.

As appears from FIG. 2, the scoring machine 1 comprises a structure 11 having a curved path 7, a number of scoring devices 14 (See FIG. 4) being mounted on the structure 11 in such a manner that they are movable along the curved path 7. The curved path 7 may be constituted by any structure 11 with a circle or a circular segment constituting a curved path 7 that fits the item to be scored, the curved path 7 having a number of movable scoring devices 14 mounted on it.

In the embodiment shown, the curved path 7 corresponds to the curvature extending transversely to the main dimension of a loin of a pig, the loin piece being substantially plane in its main dimension and curved transversely to its main dimension, and the structure 11 having a curved path extending transversely to both the transport path 2 and the direction of movement 3 of the item moved.

In a preferred embodiment, the items conveyed have the surface to be scored facing downwards against the first conveyor 4, but in an alternative embodiment, the surface to be scored might face away from the surface of the first conveyor 4, which would thus presuppose that the conveyor 4 was set to convey the item to be scored towards the diagonally opposite side of the curved path 7 and that the conveyors 4, 5 were closer to each other.

The scoring machine 1 may be operated manually by reciprocating the scoring devices 14 along the curved path 7 or, as is possible in the embodiment shown here where the curved path 7 constitutes a circle, by moving the scoring devices 14 in the same direction all the time and accordingly around the item to be scored.

Conventional endless conveyor belts which are, for example, smooth, have a non-absorbent surface, are resistant and easy to clean may be used as conveyors 4, 5, but depending on the items to be conveyed and the requirements made of cleaning and hygiene, other conveyors such as modular belts in many different designs may of course also be used.

In a preferred embodiment, the conveyors 4, 5 are straight, but they may of course also be curved if the items to be scored are to be conveyed around a corner, for example. Moreover, the conveyers may have individual dimensions, be made of different materials and run at respective speeds.

In the embodiment shown in FIGS. 1, 2 and 3, the conveyors 4, 5 are mounted and set for the scoring machine to make the optimum scoring of loin pieces. Experiments have shown that it is advantageous to set the conveyors 4, 5 so that their surfaces are not aligned in the same plane, but are set so that the item to be scored is conveyed along what can best be described as a soft curve, whereby the surface of the item becomes slightly flexed outwards, which makes the scoring easier. This setting of the scoring machine 1 appears best from FIG. 3. As also apparent from FIG. 3 the first conveyor 4 and the second conveyor 5 need not be symmetrically arranged with respect to the tubular bearing 6, but may preferably be adjustable upwardly and downwardly, as well as possible in inclination. This adjustability makes it possible optimize the conveying of the items along the curved surface 7 to and from the first conveyor 4 and the second conveyor 5, depending on the quality of the items and their mechanical properties, depending in turn on inter alia their temperature.

Of course, it will also be obvious to a worker skilled in the art that the two conveyors 4, 5 can be adjusted and set at any other imaginable position depending on the nature of the item to be scored and depending on its behaviour during scoring.

As appears from FIG. 4, the structure 11 comprises a bearing in the form of a tubular bearing 16 having an external tubular bearing part 13 and an internal tubular bearing part 12, the internal tubular bearing part 12 having a curved path 7. On the external tubular bearing part 13, the scoring device 14 is mounted so that it can rotate about the centre line of the tubular bearing parts 12, 13 and transversely to the direction of movement 3 of the item moved. The movement may be made manually, but in the preferred embodiment the movement is made by means of a driven mechanism.

As described above, it may be advantageous to set the conveyors 4, 5 so that their surfaces are not aligned in the same plane, but are set so that the item to be scored is conveyed along what can best be described as a soft curve, whereby the surface of the item becomes slightly flexed outwards, which makes the scoring easier. In the preferred embodiment, the scoring device 14 is therefore mounted on the end of the external tubular bearing part 13, which faces away from the direction of movement 3 of the item moved.

However, the structure makes it possible to reverse the direction of movement 3 of the scoring machine 1 so that the scoring can be made before the item is conveyed to and passes through the tubular bearing 16.

According to the embodiment shown, the scoring machine 1 further comprises a frame 8 with a plate 9, the plate 9 having a hole 10, the internal tubular bearing part 12 being firmly mounted on the plate 9 in such a manner that the hole 10 and the internal tubular bearing part 12 have substantially the same centre line and that the diameter of the hole 10 is at least equal to or larger than the inside diameter of the internal tubular bearing part 12.

In the preferred embodiment, the internal tubular bearing part 12 has a number of guiding devices 15 shown in FIG. 2. These guiding devices 15 may be in the shape of one or more simple side guides to guide the item to be scored through the tubular bearing 16.

Also, friction-reducing means such as a teflon coating or devices in the form of balls, pins or the like may be placed on parts or the whole of the curved path 7 constituting the contact surface of the tubular bearing 16 with the item to be scored.

Alternatively, an aggregate guide or guiding device having friction-reducing means may be provided to guide the item to be scored from the first conveyor 4 to the scoring devices 14.

In a preferred embodiment, the internal tubular bearing part 12 has a diameter of 230-310 mm, preferably 250-290 mm, and most preferably 270 mm, while the external tubular bearing part 13 has a diameter of 360-440 mm, preferably 380-420 mm, and most preferably 400 mm, and the tubular bearing 16 has a height of 60-140 mm, preferably 80-120 mm, and most preferably 100 mm.

This embodiment of a tubular bearing 16 makes it possible for the scoring machine 1 to make the optimum scoring of loin pieces because the curved path 7 of the internal tubular bearing part 12 corresponds to the curvature of the given loin pieces.

That the structure 11 can be moved manually by reciprocating the scoring devices 14 along the curved path 7 or, as is possible in the embodiment shown here, by moving the scoring devices 14 in the same direction all the time and accordingly around the item to be scored is certainly a possibility, but it is endeavoured to use a drive mechanism 17 that may be constituted by a motor 18 mounted on a bracket 20, which may, for example, be mounted on the plate 9, the motor 18 driving the external tubular bearing part 13 by means of a belt 19.

The motor 18 may, for example, be electrically driven, but other possibilities might be more natural than an electric motor, depending on the situation, such as a pneumatic motor or a hydraulic motor, and the belt 19 may, for example, be a flat belt, a toothed belt, a V-belt or whatever is possible.

The scoring devices 14 are naturally exposed to contact with the items to be scored, and the scoring devices 14 are thereby subject to wear, and of course there will therefore also be a need to be able to detect when the maximum permissible change in the condition of the scoring devices has occurred, while damage suddenly arisen to the scoring devices 14 has to be addressed immediately. In a preferred embodiment of the invention, detection means, not shown in the Figures, in the form of, for example, sensors or light barriers are mounted on the structure 11.

To minimise the risk of damage suddenly occurring to the scoring devices 14, it will therefore be expedient to use scoring devices 14 of a ceramic design, but this will again depend on the item to be scored and the materials available.

The embodiment shown has been made with a particular view to the scoring of portions of a carcass, the portions being loin pieces from pigs having a slaughter weight of between 65 and 110 kg, the loin pieces having an average length of 620 mm and a width of 150-170 mm. The loin pieces are without bones and have not been derinded, and after passage through the scoring machine the scored loin piece can thus be sold as a pork roast.

However, there are many other possibilities when using the scoring machine 1 according to the invention as, with a different setting of the scoring rate, the scoring machine 1 could score or pre-cut streaky bacon, cutlets or other portions from pigs.

Likewise, scoring in loin pieces without a rind, loin fillets and the like may be of help to consumers who might want to use cheese, herbs, garlic, marinades and the like in their cooking.

If two structures 11 are set up in continuation of each other so that the items to be scored pass through both the structures 11 through transport path 2 and if the structures 11 are angled so that the distance between them is smaller on one side of the transport path 2 than on the other, it is thus possible to make scores in two directions constituting squares in the surface of the items to be scored.

For a worker skilled in the art, there will certainly also be a number of tasks outside the food industry for which a scoring by means of this invention will be usable, and the invention is thus not limited to the food industry.

In the drawing, the following reference numerals have been used for the designations used in the detailed part of the description:
1 scoring machine
2 transport path
3 direction of movement
4 first conveyor (inlet)
5 second conveyor (discharge)
6 third conveyor
7 curved path
8 frame
9 plate
10 hole
11 structure
12 internal tubular bearing part
13 external tubular bearing part
14 scoring device
15 guiding device
16 tubular bearing
17 drive mechanism
18 motor
19 belt
20 bracket

The invention claimed is:

1. A scoring machine for scoring a surface of an item which is substantially plane in its main dimension and is curved transversely to its main dimension, the item being moved along a transport path in a direction of movement, such as a surface of an item being conveyed forwards by a number of conveyors, wherein the scoring machine comprises a structure with a curved path adapted to have substantially the same curvature as the conveyed item transversely to its main dimension, and a number of scoring devices being mounted on the structure in such a manner that the scoring devices are movable along the curved path extending transversely to both the transport path and the direction of movement of the item moved, wherein the structure comprises a tubular bearing having an internal tubular bearing part with a curved path and an external tubular bearing part, the scoring device being mounted on the external tubular bearing part in such a manner that the scoring device can rotate about the centre line of the tubular bearing parts and transversely to the direction of movement of the item moved by a drive mechanism.

2. A scoring machine according to claim 1, wherein the scoring device is mounted on the end of the external tubular bearing part which faces away from the direction of movement of the item moved.

3. A scoring machine according to claim 1, wherein the scoring machine further comprises a frame with a plate, the plate having a hole, the internal tubular bearing part being firmly mounted on the plate in such a manner that the hole and the internal tubular bearing part have substantially the same centre line and that the diameter of the hole is at least equal to or larger than the inside diameter of the internal tubular bearing part.

4. A scoring machine according to claim 1, wherein the scoring machine comprises a number of conveyors, a first conveyor leading to the side of the structure facing against the direction of movement of the item moved, and a second conveyor leading away from the structure in the direction of movement of the item moved.

5. A scoring machine according to claim 4, wherein the scoring machine further comprises a third conveyor extending through the hole and having, along a length thereof, substantially the same distance from the sides to the first conveyor or the second conveyor.

6. A scoring machine according to claim 1, wherein a number of guiding devices are provided in the internal tubular bearing part.

7. A scoring machine according to claim 1, wherein the drive mechanism comprises a motor mounted on a bracket on the plate, the motor driving the external tubular bearing part by a belt.

8. A scoring machine according to claim 7, wherein the belt comprises, a flat belt, a toothed belt or a V-belt.

9. A scoring machine according to claim 1, wherein the scoring machine further has a detector in the form of, for example, sensors or light barriers.

10. A scoring machine according to claim 1, wherein the number of the scoring devices comprise ceramic scoring devices.

11. The use of a scoring machine according to claim 1 for scoring portions of a carcass, the portions being, for example, loin pieces.

12. A scoring machine according to claim 1, wherein the internal tubular bearing part has a diameter of 230-310 mm.

13. A scoring machine according to claim 1, wherein the internal tubular bearing part has a diameter of 250-290 mm.

14. A scoring machine according to claim 1, wherein the internal tubular bearing part has a diameter of 270 mm.

15. A scoring machine according to claim 1, wherein the external tubular bearing part has a diameter of 360-440 mm.

16. A scoring machine according to claim 1, wherein the external tubular bearing part has a diameter of 380-420 mm.

17. A scoring machine according to claim 1, wherein the external tubular bearing part has a diameter of 400 mm.

18. A scoring machine according to claim 1, wherein the tubular bearing has a height of 60-140 mm.

19. A scoring machine according to claim 1, wherein the tubular bearing has a height of 80-120 mm.

20. A scoring machine according to claim 1, wherein the tubular bearing has a height of 100 mm.

21. A scoring machine according to claim 1, the external tubular bearing part being rotatable around the internal tubular bearing part.

* * * * *